May 3, 1960 P. H. MONAGHAN 2,934,955
APPARATUS FOR MEASURING TEMPERATURES
Filed July 22, 1957
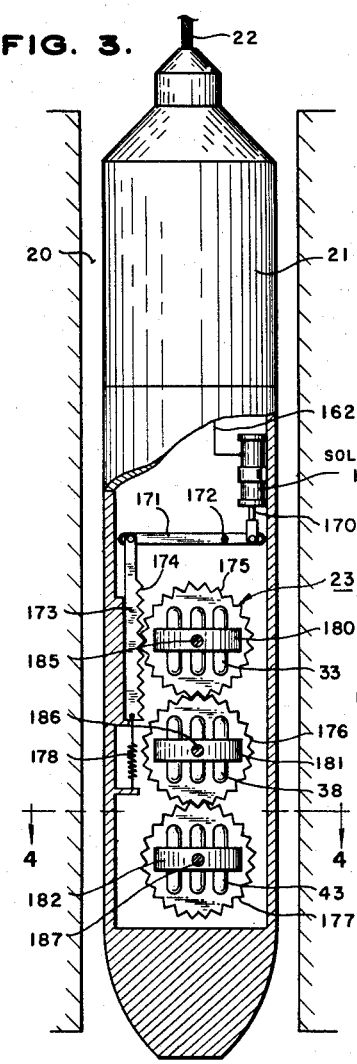
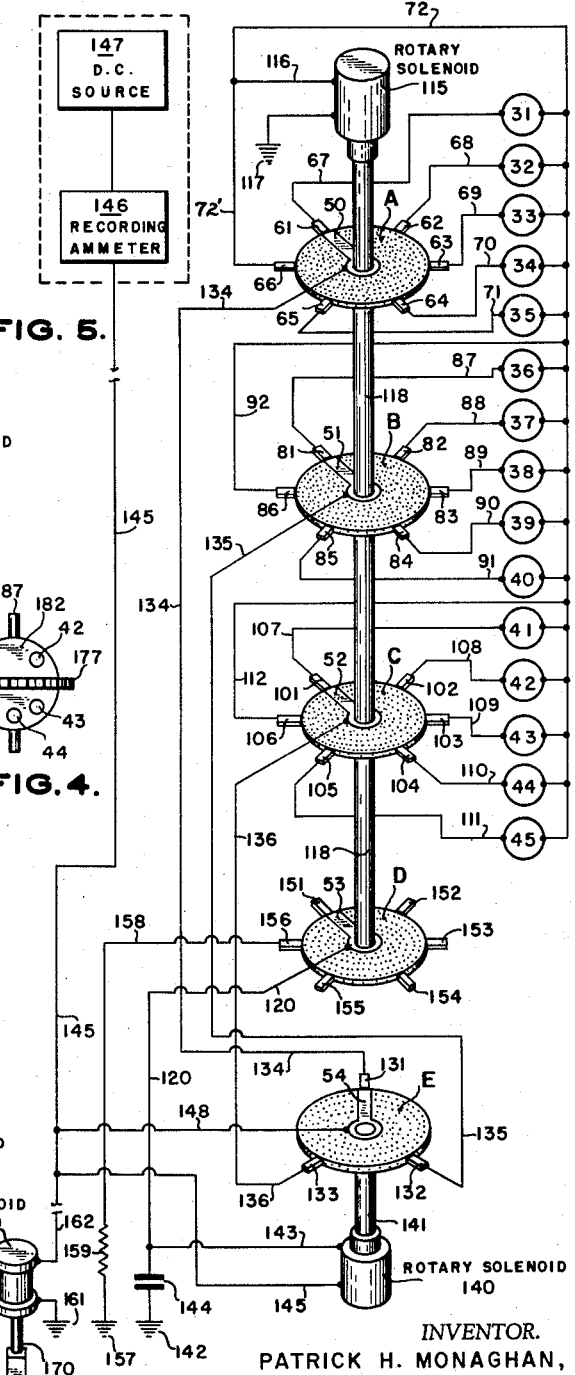
INVENTOR.
PATRICK H. MONAGHAN,
BY John A. Schneider
ATTORNEY.

United States Patent Office 2,934,955
Patented May 3, 1960

---

2,934,955

APPARATUS FOR MEASURING TEMPERATURES

Patrick H. Monaghan, Bellaire, Tex., assignor, by mesne assignments, to Jersey Production Research Company, Tulsa, Okla., a corporation of Delaware Application July 22, 1957, Serial No. 673,409

8 Claims. (Cl. 73—358)

This invention relates to temperature measuring apparatus especially adaptable for use in measuring temperatures in boreholes.

Thermal properties of subsurface formations are useful in determining various characteristics of the subsurface formations, such as porosity, permeability, etc. Therefore, accurate measurement of temperatures in wells, either as a function of depth or of time, is desirable in order to obtain information concerning characteristics of formations surrounding the well. Since direct temperature observation cannot be made in the well or borehole, the temperature indications must be transmitted to the earth's surface. It is advantageous to transmit and register these temperature indications as the borehole is traversed or logged.

Briefly, the invention comprises a thermal-conducting container having arranged therein an electrically non-conductive meltable substance, an electrically conducting liquid, the meltable substance and the conducting liquid being of different densities, electrical contacts, and an electrical circuit including a source of voltage and a recorder connected to said contacts whereby when said meltable substance melts said conductive liquid engages said electrical contacts to complete said electrical circuit.

Accordingly, an object of this invention is to provide apparatus for measuring the temperatures in a borehole.

A further object of this invention is to transmit to and record at the earth's surface borehole temperatures as the borehole is logged. These and other objects of the invention will be apparent from a description of the invention taken in conjunction with the drawings wherein:

Fig. 1 is a vertical view of a temperature sensing element in non-recording position and an electrical circuit employed therewith;

Fig. 2 is a vertical view of a temperature sensing element in recording position and an electrical circuit employed therewith;

Fig. 3 is a vertical view of the device of the invention arranged in a borehole illustrating in particular apparatus employed for inverting the temperature sensing element of the invention;

Fig. 4 is a view taken on lines 4—4 of Fig. 3; and

Fig. 5 is a schematic illustration of the electrical circuit utilized when a plurality of the elements of Figs. 1 and 2 are operated together.

In Fig. 1 is shown a thermal-conducting small diameter tube or container 10 having arranged therein an electrically conductive liquid, such as mercury 11, an electrically non-conductive meltable solid 12, less dense than the conductive liquid, and electrical contacts 13. As shown, the mercury is arranged in the upper portion of the tube 10 and the solid material 12 is arranged below the mercury 11. The electrical contacts 13 are arranged in the lower portion of the tube in the non-conductive solid 12. An electrical circuit 14 is connected to electrical contacts 13 and includes a source of voltage 15 and a recording ammeter 16.

In Fig. 2 is shown tube 10, non-conductive material 12, mercury 11, and electrical contacts 13. However, in Fig. 2, the meltable solid 12 has been displaced by the mercury 11. That is, the mercury is now in the lower portion of the tube 10 and surrounds the electrical contacts 13 and the melted solid 12 is in the upper portion of the tube 10. The electrical circuit 14, including the source of voltage 15 and the recorder 16 is shown connected to the electrical contacts 13.

In Fig. 3 is shown a borehole 20 in which is arranged a housing 21 to which is connected an electrically conductive cable 22. The various temperature sensing elements and the other apparatus such as switches and inverting mechanism are arranged in housing 21. The inverting mechanism designated generally by numeral 23 will be described in detail later herein.

The electrical circuit for operating the device of the invention when employing a plurality of temperature sensing elements is illustrated in Fig. 5. A plurality of small diameter tubes 10, similar to the small diameter tubes of Figs. 1 and 2, are designated in Fig. 5 by numerals 31 through 45. Also shown in Fig. 5 are five switches designated A, B, C, D, and E which are provided with contact arms 50, 51, 52, 53, and 54, respectively. Switch A is provided with a series of contacts 61 through 66. Contacts 61 through 65 are electrically connected to a rotary solenoid 115 through small diameter tubes 31 through 35, respectively, by leads 67 through 71, respectively, and leads 72 and 116. Contact 66 is also connected to solenoid 115 by leads 72' and 116. Similarly, switch B is provided with a plurality of contacts 81 through 85 which are connected to solenoid 115 through small diameter tubes 36 through 40, respectively, by leads 87 through 91, respectively, and by leads 72 and 116. Also, switch B is provided with a contact 86 which electrically connects to solenoid 115 through leads 92, 72, and 116.

Similarly, switch C is provided with a plurality of switch contacts 101 through 105, which are connected to solenoid 115 through small diameter tubes 41 through 45, respectively, by leads 107 through 111, respectively, and by leads 72 and 116. Also, switch C is provided with a contact 106 which is connected to solenoid 115 through leads 112, 72 and 116. Rotary solenoid 115 is grounded as at 117.

Also, rotary solenoid 115 has connected thereto a rotatable shaft 118 upon which are mounted switches A, B, C, and D. Thus, shaft 118 is adapted to rotate switches A, B, C, and D upon energization of solenoid 115.

Switch E, which is not mounted on shaft 118, but which is rotatable, is provided with a plurality of contacts 131, 132, and 133. Contact 131 is connected to contact arm 50 of switch A by a lead 134. Contact 132 is connected to contact arm 51 of switch B by a lead 135 and contact 133 is connected to switch arm 52 of switch C by a lead 136.

A rotary solenoid 140 is mechanically connected to switch E by means of a shaft 141. Solenoid 140 is grounded, as at 142, by a lead 143 to which is connected a damping capacitor 144. Another lead 145 is connected to solenoid 140 which lead also connects to a recording ammeter 146 and a source of voltage, such as D.C. source 147. Switch arm 54 of switch E is electrically connected to lead 145 by a lead 148.

Switch D is provided with a plurality of contacts or positions 151 through 155. Also, switch D is provided with a contact 156, which is grounded as at 157 by a lead 158 in which is connected a resistance 159. Also a lead 120 connects switch arm 53 to lead 143 which lead is connected to rotary solenoid 140. A solenoid 160, grounded as at 161, is connected to lead 145 by a lead 162.

In Figs. 3 and 4 is shown an apparatus which may be employed for inverting the various temperature sensing elements or small diameter tubes shown in Figs. 1, 2, and 5. As seen in Fig. 3, solenoid 160 has associated therewith a plunger 170 to which is connected a pivotal lever arm 171, pivoted as at 172. Connected to pivot arm 171 is a rack 173 provided with gear teeth 174, which gear teeth are adapted to mesh with the gear teeth 175. Gear teeth 175, in turn, mesh with gear teeth 176 which, in turn, mesh with gear teeth 177. Rack 173 is biased downwardly by a spring 178 which is connected to one end of rack 173. Gear teeth 175, 176, and 177 are arranged to surround sensing element support plates 180, 181, and 182. Thus, as noted in Fig. 4, supporting plate 182, about which is arranged gear teeth 175, is provided with small diameter tubes 41 through 45. The plates 180, 181, and 182 may be suitably pivoted on members 185, 186, and 187.

The detailed structural mountings of the apparatus, as shown in Figs. 3 and 4, for inverting the tubes, and in Fig. 5 for rotating switches A, B, C, D, and E by means of the rotary solenoids have not been shown since such structures are conventional and within the skill of the art.

The invention in its most basic form is illustrated in Figs. 1 and 2. The tube 10, containing the solid non-conductive material 12 surrounding electrodes 13 and mercury 11 arranged above the non-conductive material, is arranged so that the recording ammeter 16 may be positioned remote from tube 10. When the temperature rises sufficiently to melt the non-conductive material 12, the mercury, being of greater density than the melted solid, displaces the melted solid 12, as seen in Fig. 2, which completes the electrical circuit through the electrical contacts 13 and the completed circuit is recorded by ammeter 16.

This type of temperature measuring device is especially adaptable for use in well bore temperature logging. Thus, as illustrated in Fig. 3, the thermometer which may comprise a plurality of tubes 10, containing various non-conductive solids, which solids melt at selected different temperatures, is contained in a housing 21 and suspended in the borehole 20 by means of cable 22. Since, in general, the temperature increases as the depth increases, as the housing 21 is lowered in the borehole the solids in the various small diameter tubes melt at different depths (and times). When each solid melts, a signal or electrical pulse is transmitted by way of cable 22 to the recording ammeter 16 at the earth's surface and the specific temperature at a specific depth or specific time is thereby known.

In order to facilitate recording of a plurality of temperatures a circuit such as illustrated in Fig. 5 may be utilized. Herein temperature sensing elements such as the small diameter tubes, shown in Figs. 1 and 2, filled with solid materials of known melting point above which is located a drop of mercury, are indicated by numerals 31 through 45. As housing 21 containing the tubes is lowered in the well and the melting point of each successive compound is reached, the mercury falls through the melted solid and completes the electrical circuit through the electrical contacts contained in the bottom of the tube, as in the operation described with relation to Figs. 1 and 2. Small diameter tubes 31 through 45 are filled with non-conductive compounds of increasing melting point. An electrical means is provided for transmitting the results to the earth's surface when, for example, the compound in tube 31 melts and for automatically switching from tube 31 to capillary tube 32 and then to tube 33 and so on as each compound melts. The surface equipment consists of a D.C. source 147 and a recording ammeter 146 connected to the temperature sensing elements contained in housing 21 through the single conductor cable 22.

At the start of the temperature traverse or log, switches A, B, C, D, and E are in the positions shown in Fig. 5. As the temperature increases as the traverse of the borehole is made, the non-conductive substance in tube 31 melts thereby completing the electrical circuit from the D.C. source through contact 131 of switch E and through contact 61 of switch A to the rotary solenoid 115. This causes the rotary solenoid 115 to close thereby rotating shaft 118 which rotates switches A, B, C, and D to place switch arms 50, 51, 52, and 53 in contact with contacts 62, 82, 102, and 152, respectively. When switch arm 50 moves out of contact with contact 61 and into contact with contact 62, the electrical circuit is open and solenoid 115 is deenergized until the melting point temperature of the compound in small diameter tube 32 is reached. At this time, the cycle noted above is repeated and switches A, B, C, and D are advanced to contacts 63, 83, 103, and 153, respectively. The cycle is repeated until the temperature of tube 35 is reached. When the solid material in tube 35 melts, switches A, B, C, and D are advanced to contacts 66, 86, 106, and 156, respectively. Contact 156 of switch D grounds rotary solenoid 140 and thereby causes switch E to rotate from contact 131 to contact 132. At the same time, rotary solenoid 115 is connected to the source of D.C. voltage 147 through contact 66 on switch A and therefore indexes contact arm 50 back to contact 61. This simultaneous rotation of the rotary solenoids causes the switches A to D to be returned to their initial positions and the source of D.C. voltage 147 is connected to the rotor of switch B by way of arm 54 and contact 132 on switch E thereby connecting the temperature sensitive elements 36 through 40 to the rotary solenoid 115. After the solid material in small diameter tube 40 has melted, the cycle is repeated and the source of D.C. voltage is connected to the rotor of switch C.

The capacitor 144 connected to rotary solenoid 140 is a damping capacitor to insure that rotary solenoid 140 will complete its stroke in the event rotary solenoid 115 operates ahead of it. Thus, if rotary solenoid 115 on position 66, 86, 106, and 156 of switches A, B, C, and D should complete its actions before rotary solenoid 140, then the movement of switch D from the position wherein contact arm 53 is in contact with contact 156 to the position wherein contact arm 53 is in contact with contact 151 would inactivate rotary solenoid 140. However, the presence of damping capacitor 144, which at this time will be in a discharged condition, will allow current to continue to flow through rotary solenoid 140. This builds up the charge on the damping capacitor 144 and insures that the rotary solenoid 140 will complete its action. Alternatively, the rotation of switch E may be assumed by coupling switch E to the common shaft 118 of switches A, B, C, and D through a suitable reduction gear so that one rotation of shaft 118 would cause switch E to index one position.

Use of the reduction gear would eliminate rotary solenoid 140 and associated electrical circuits.

The surface indication as each material melts and indexes rotary solenoid 115 to the next tube is a pulse of current on the recording ammeter 146. The blank pulses on positions 66, 86, 106 and 156 of switches A, B, C, and D are distinguishable from the other pulses since both solenoids 115 and 140 are operating together on these positions and the pulse is of twice the amplitude of the other pulses. The count of the number of pulses appearing on the recorder trace indicates the maximum temperature in the well.

Solenoid 160 is employed to reverse or invert the temperature sensitive small diameter tubes. It operates at a higher voltage than solenoids 115 and 140; therefore, it is activated only when the surface voltage is increased. As seen in Figs. 3 and 4, a mechanical linkage is provided between the solenoid 160 and the temperature sensitive tube elements. Thus, when solenoid 160 is activated, rod 170 is moved downwardly thereby causing rod 171 to pivot about the pivot 172 and move rack 173 upwardly against the bias of spring 178. Gear teeth 174 mesh with gear teeth 175 which rotates plate 180 in one direction. Since gear teeth 175 mesh with gear teeth 176 and gear teeth 176 mesh with gear teeth 177 all of the tubes are inverted simultaneously.

When the temperature sensitive elements are inverted, the mercury reverses its position. Thus, when solenoid 160 is activated, tubes 31 through 45 are inverted and the electrical circuits in all temperature sensitive elements are broken. When solenoid 160 is deactivated, the temperature sensitive elements are returned to their original position under the bias of spring 178, and the instrument is reset for another temperature survey. Of course, inversion of the tubes must be performed when the meltable solid is in the liquid phase. The inverted position must be maintained until the meltable solid again assumes the solid phase. Then, the tubes may assume their original or initial positions.

Various compounds may be used as the meltable solid. The only criteria being that the solids have specific known melting points and that the displacing liquid be of different density than the solid in order to displace the liquefied solid. As an example, in the following table is a list of suitable compounds that may be utilized for various temperature ranges. Additional compounds may be found in "Handbook of Chemistry and Physics," 32nd edition, 1950–51.

*List of compounds suitable for use in melting point thermometer*

| Temp., ° C. | Compound |
|---|---|
| 20 | p-chloroacetophenone. |
| 21 | 1-chloro-4-ethoxybenzene. |
| 22 | cetyl iodide. |
| 23 | isoamyl octadecanoate. |
| 24 | α-iodotoluene. |
| 25 | p-methoxybenzyl alcohol. |
| 26 | 2,4-dimethyl phenol. |
| 27 | 1,2-diiodobenzene. |
| 28 | n-octadecane. |
| 29 | α,4-dichlorotoluene. |
| 30 | 6-dodecanol. |
| 40 | Heneicosane ($C_{21}H_{44}$). |
| 50 | bromoacetic acid. |
| 60 | p-heptyloxyphenol. |
| 70 | phenyl benzoate. |
| 80 | 9-methylanthracene. |
| 90 | 4-methoxybiphenyl. |
| 100 | 1,2,4-benzenetriamine. |
| 110 | octanamide. |
| 120 | 2,3-dichloronaphthalene. |
| 130 | 6-nitrosalicylic acid. |
| 140 | 1,8-naphthalenediol. |
| 150 | 2,4,6-trimethylresorcinol. |

Although the invention has been described and illustrated using an electrically non-conducting, meltable, less dense solid substance arranged below an electrically conducting, more dense liquid, the scope of the invention is not to be considered as limited thereto. Various modifications are possible as, for example, using an electrically conducting meltable solid substance and an electrically nonconducting liquid (herein temperature indications may be when an electrical circuit is broken, instead when completed); or using a more dense meltable solid substance and a less dense liquid (herein electrical contacts may be positioned in the upper end of the container instead of in the lower end); or any desired combination thereof.

Having fully described the nature, objects, elements, and operation of my invention, I claim:

1. A temperature measuring device adapted to be raised and lowered in a well bore comprising a housing provided with a plurality of temperature sensing elements; each of said elements including a thermal-conducting container having arranged therein an electrically non-conductive meltable substance, each substance being adapted to melt at selected, progressively varying temperatures, an electrically conductive liquid and electrical contacts, said meltable substance initially being in the solid phase and surrounding said electrical contacts and arranged below said electrically conductive liquid; an electrically conductive cable connected to said housing and extending to the earth's surface adapted to raise and lower said housing in the borehole and adapted to conduct electrical pulses to the earth's surface; an electrical circuit including a source of voltage and a recorder adapted to selectively connect with said electrical contacts whereby when each of said meltable substances melts said electrically conductive liquid displaces said non-conducting substance and completes said electrical circuit; switching means adapted to sequentially connect said elements with said electrical circuit; and means adapted to invert said containers.

2. A device as recited in claim 1 wherein said electrically conductive liquid is mercury.

3. A device as recited in claim 2 wherein said containers are small diameter tubes.

4. A temperature measuring device comprising a plurality of temperature sensing elements, each of said elements including a thermal conducting container having arranged therein first and second materials and electrical contacts, one of said materials being electrically conducting and the other of said materials being electrically nonconducting, said first material being a meltable substance initially in the solid phase and said second material being a liquid, one of said materials initially surrounding said electrical contacts, each of said substances being meltable at a selected temperature, the temperatures varying progressively for the substances, and an electrical circuit including a source of voltage and a recorder connected to said electrical contacts whereby when each of said meltable substances melts one of said materials displaces the other of said materials to provide temperature indications.

5. A device as recited in claim 4 wherein said first material is electrically nonconductive and said second material is electrically conductive, said first material initially surrounding said electrical contacts and being displaced by said second material when said first material melts.

6. A device as recited in claim 5 including switching means adapted to automatically and progressively connect the next succeeding element containing the meltable substance having the next higher melting point into said electrical circuit when the meltable substance in a container melts.

7. A device as recited in claim 6 including inversion means connected to said elements adapted to invert said elements simultaneously.

8. A device as recited in claim 7 including electrical-mechanical switching and inversion means.

References Cited in the file of this patent

UNITED STATES PATENTS

| 265,866 | Reissig | Oct. 10, 1882 |
| 397,548 | Hoffmann | Feb. 12, 1889 |
| 1,645,201 | McBrien | Oct. 11, 1927 |
| 2,740,866 | Wappner | Apr. 3, 1956 |